(12) United States Patent
Danforth et al.

(10) Patent No.: US 7,293,282 B2
(45) Date of Patent: Nov. 6, 2007

(54) METHOD TO BLOCK UNAUTHORIZED ACCESS TO TFTP SERVER CONFIGURATION FILES

(75) Inventors: Andrew Danforth, Herndon, VA (US); Kenneth Gould, Oakton, VA (US)

(73) Assignee: Time Warner Cable, Inc., Stamford, CT (US)

( * ) Notice: Subject to any disclaimer, the term of this patent is extended or adjusted under 35 U.S.C. 154(b) by 1007 days.

(21) Appl. No.: 10/613,659

(22) Filed: Jul. 3, 2003

(65) Prior Publication Data

US 2005/0005154 A1    Jan. 6, 2005

(51) Int. Cl.
*H04L 9/00*    (2006.01)
(52) U.S. Cl. .......................................... 726/4; 713/168
(58) Field of Classification Search ................ 726/4, 726/18, 21; 713/155–159, 168, 200; 380/229; 705/67
See application file for complete search history.

(56) References Cited

U.S. PATENT DOCUMENTS

| | | | |
|---|---|---|---|
| 5,528,595 A | | 6/1996 | Walsh et al. |
| 6,049,826 A | * | 4/2000 | Beser .......................... 709/222 |
| 6,170,061 B1 | | 1/2001 | Beser |
| 6,195,689 B1 | | 2/2001 | Bahlmann |
| 6,208,656 B1 | | 3/2001 | Hrastar et al. |
| 6,249,523 B1 | | 6/2001 | Hrastar et al. |
| 6,286,058 B1 | | 9/2001 | Hrastar et al. |
| 6,324,267 B1 | | 11/2001 | Hraster et al. |
| 6,359,882 B1 | | 3/2002 | Robles et al. |
| 6,405,253 B1 | | 6/2002 | Schutte et al. |
| 6,430,193 B1 | | 8/2002 | Raissinia et al. |
| 6,546,017 B1 | | 4/2003 | Khaunte |
| 6,598,057 B1 | * | 7/2003 | Synnestvedt et al. ....... 707/200 |
| 6,917,628 B2 | * | 7/2005 | McKinnin et al. .......... 370/468 |
| 2001/0032311 A1 | | 10/2001 | White |
| 2002/0023160 A1 | | 2/2002 | Garrett et al. |
| 2002/0035623 A1 | | 3/2002 | Lawande et al. |
| 2002/0073433 A1 | | 6/2002 | Furuta |
| 2002/0144284 A1 | | 10/2002 | Burroughs et al. |

(Continued)

OTHER PUBLICATIONS

Alexander, et al, "DHCP Options and BOOTP Vendor Extensions", Mar. 1997.

(Continued)

*Primary Examiner*—Kambiz Zand
*Assistant Examiner*—Yonas Bayou
(74) *Attorney, Agent, or Firm*—Roberts Mardula & Wertheim, LLC

(57) ABSTRACT

The present invention teaches methods and systems for blocking unauthorized access to cable modem configuration files stored on trivial file transfer protocol (TFTP) servers. Filenames are modified by the DHCP to incorporate an authentication key (and optional cloaking) prior to transmission to the cable modem. When the TFTP server receives a modified filename, it also generates an authentication key. The authentication keys must match in order for the cable modem to receive the configuration file requested. At a minimum, authentication keys depend upon the un-modified filename, the cable modem IP address and a "coordination pass phrase" known to the TFTP server and DHCP server, but not known to the cable modem. Variations include optional cloaking, various actions performed for non-matching authentication keys, selection of authentication key generating algorithm and inclusion of cable modem MAC address in the authentication key for all cable modems or for premium service customer cable modems.

51 Claims, 9 Drawing Sheets

U.S. PATENT DOCUMENTS

2003/0033379 A1  2/2003  Civanlar et al.
2003/0070063 A1  4/2003  Boyle et al.
2003/0093669 A1  5/2003  Morais et al.

OTHER PUBLICATIONS

Cable Television Laboratories, Inc., "Data-Over-Cable Service Interface Specifications: Baseline Privacy Plus Interface Specification", SP-BPI+-I09-020830, Aug. 30, 2002.

Cable Television Laboratories, Inc., "Data-Over-Cable Service Interface Specifications: Radio Frequency Interface Specification", SP-RFIv1.1-I09-020830, Aug. 30, 2002.

Cable Television Laboratories, Inc., "Data-Over-Cable Service Interface Specifications: Radio Frequency Interface Specification", SP-RFIv2.0-I03-021218, Dec. 18, 2002.

Communications Technology, "Cable Modem Security: Insulating Your Network While Keeping Your Subscribers Safe from Each Other", Oct. 2001.

Croft et al, "Bootstrap Protocol (BOOTP)", Sep. 1985.

Droms, "Dynamic Host Configuration Protocol", Mar. 1997.

Jacobs, et al, "Bandwidth Burglary in Broad Daylight: How to Prevent a Simple Hack", Jan. 2003.

Pfendtner, "DOCSIS Network Security at WH-Netz", Nov. 20, 2002.

Rivest, "The MD5 Message-Digest Algorithm", Apr. 1992.

Society of Cable Telecommunications Engineers, Inc., "Data-Over-Cable Service Interface Specification: DOCSIS 1.0 Radio Frequency Interface (RFI)", ANSI/SCTE 22-1 2002 (formerly DSS 02-05).

Sollins, "The TFTP Protocol (Revision 2)", Jul. 1992.

Technical Communications Corporation, "Technical Discussion on Key Length vs. Time to Break", 1996.

Wimer, "Clarifications and Extensions for the Bootstrap Protocol", Oct. 1993.

* cited by examiner

US 7,293,282 B2

METHOD TO BLOCK UNAUTHORIZED ACCESS TO TFTP SERVER CONFIGURATION FILES

FIELD OF THE INVENTION

The present invention relates to methods reducing or eliminating unauthorized use of broadband data services by addressing inherent weaknesses in the interactions between trivial file transfer protocol servers and cable modems.

BACKGROUND OF THE INVENTION

Internet use involves accessing one or more remote Internet servers for purposes of downloading information or digital files as well as uploading files and messages. Access is accomplished by connecting a terminal or terminal means to a carrier network. Terminal means include traditional terminals, personal computers (PC) and game console devices equipped with network connectivity. Additional devices are used between the terminal means and the carrier network. Such devices include local networking electronic devices as well as electronic devices that connect a local network or terminal means to an external network. Examples of local networking devices include network hubs, network switches, network bridges, network interface cards, and the like. Examples of devices to connect a local network to an external network include routers, cable modems, DSL modems, dial-up modems, and the like.

As used herein, Customer Premises Equipment (CPE) includes terminal means (such as terminals, personal computer or game consoles), local networking devices and electronic devices to connect a local network to an external network such as a carrier network.

As used herein, a "Carrier Network" generally refers to a computer network through which users communicate with various service providers (e.g. Internet web servers). The Carrier Network may be an external network extending from the local network to other external networks, for example, the Internet or "world wide web". The Carrier Network is maintained by a "Carrier," which also may serve as a service provider for certain services. For example, a Carrier or a related entity may serve as an Internet service provider (ISP).

Carrier Networks include "Shared Access Carrier Networks," in which data of multiple users are conveyed together over a shared communications medium between the users and the Intermediate Network, and "Dedicated Connection Carrier Networks," in which data of each user is conveyed alone between the user and the Intermediate Network and are not combined with data of other users. One of the most prevalent Shared Access Carrier Networks today is found in the Data-Over-Cable (DOC) Network, which includes the traditional network constructed from coaxial cable and the hybrid fiber coaxial (HFC) network constructed with both fiber optical cabling and coaxial cable. Other Shared Access Carrier Networks include wireless and digital subscriber line (xDSL) networks (the xDSL lines typically being aggregated onto an oversubscribed backhaul trunk into the Intermediate Network, with the trunk defining the shared communications medium).

Network carriers and their equipment providers have adopted industry standards in order to increase interchangeability and reduce manufacturing costs for network hardware. For example, DOC Carriers have adopted industry standards such as the Data Over Cable Service Interface Specification (DOCSIS). DOCSIS version 1.0 was issued in 1997 with hardware devices being certified starting in 1999. DOCSIS version 1.1 replaced version 1.0 in 1999-2001 and now accounts for the bulk of installed DOC network equipment. Although released, DOCSIS version 2.0 is not yet widely available. As a result, networks conforming to DOCSIS (i.e. DOCSIS-compliant) use DOCSIS version 1.1 hardware in most cases.

FIG. 1 illustrates an example of such a typical DOCSIS-compliant network.

Data packets are transmitted in a downstream direction from a cable modem termination system (CMTS) 21, which is located in headend 31 (or distribution hub) of a Carrier, over a coaxial cable or combination coaxial cable and fiber optic cable 22 to respective cable modems (CMs) 14 of user local networks. CMs may attach a single terminal means to the DOCSIS-compliant network or may further comprise electronics that function as a network hub (e.g. Ethernet hub) or router function. Many times, the CMs are procured with "firewall" software that is used to block undesirable accesses to the attached local network.

All of the CMs 14 are attached by the coaxial cable 22 to the CMTS 21 in an inverted tree configuration, and each CM 14 connected to the coaxial cable 22 listens to all broadcasts from the CMTS 21 transmitted through the coaxial cable 22 for data packets addressed to it, and ignores all other data packets addressed to other CMs 14.

Theoretically, a CM 14 is capable of receiving data in the downstream direction over a 6 MHz channel with a maximum connection speed of 30-40 Mbps. Data packets also are transmitted in the upstream direction over a 2 MHz channel by the CMs 14 to the CMTS 21 typically using time division multiplexing (TDM) and at a maximum connection speed of 1.5-10 Mbps (up to 30 Mbps when DOCSIS version 2.0 is available)

The headend 31 in the DOCSIS Network includes a plurality of CMTSs, with each CMTS supporting multiple groups of CMs each connected together by a respective coaxial cable. Each such group of CMs connected to a CMTS defines a Shared Access Carrier Network, with the coaxial cable in each representing the shared communications medium. This arrangement of a group of CMs connected to a CMTS by a coaxial cable is referred to herein as a "Cable Network." Accordingly, the DOCSIS network includes a plurality of Cable Networks 20 originating from CMTSs at the headend 31 of the Carrier, with a particular Cable Network 21 being illustrated in an expanded view in FIG. 1. The DOCSIS network may also include multiple headends, for example, 31, 32 and 33.

Data transmission over a DOCSIS network can be thought of as a downstream data path and an upstream data path. Downstream paths normally refer to transmission from a web server to a terminal means, for example a terminal 11 or personal computer 12. Upstream data transmission is the opposite with data originating in terminal 11 or personal computer 12.

For purposes of this invention, customer premises equipment 20 includes the cable modems 14, terminals 11, personal computers 12 and related interconnections, power sources, etc.

FIG. 2 illustrates a special case of a DOCSIS compatible network (also referred to as a "coaxial based broadband access network"). Cable modem and local area network hub have been combined into a single cable modem hub 19. Such configurations have become particularly popular recently and include both wired and wireless (short distance FM) connections to terminal means. Characteristics of a DOCSIS compatible network include two-way transmission, a maximum 100-mile distance between the farthest cable modem and the cable modem termination system, and the coexistence with other services on the cable network.

Each cable modem is manufactured with a media access control (MAC) address. This 48-bit address is utilized as a "serial" number for purposes of identifying a unique cable modem.

Before a cable modem is permitted to provide connectivity between other CPE devices and the CMTS, it must be initialized. FIG. 3 illustrates typical steps that occur in CM initialization. Of particular interest to this invention are step 308 Establish IP Connectivity and step 312 Transfer Operational Parameters. Step 308 uses a dynamic host configuration protocol (DHCP) server to initialize the cable modem with an Internet protocol address. Also provided is the address of a TFTP server and name of the file stored on the TFTP server containing appropriate operational parameters.

Step 312 transfers a configuration file from a TFTP server to the cable modem. Trivial file transfer protocol (TFTP) servers are required to respond to requests for files with very little security checking. This inherent security weakness is often targeted by "hackers" or other individuals intent upon obtaining unauthorized use of broadband data services.

For example, some customers will attempt to abuse a broadband cable modem service by retrieving a cable modem configuration file from a TFTP server, placing that file on their personal computer and "dissecting" the file to determine how the configuration file instructs the cable modem to perform. The customer will then attempt to share the contents of this file with other "hackers" and/or will attempt to modify the file and trick their cable modem into using their modified file to steal service or upgraded class of service. As a result, broadband data service providers would like to prevent rogue customers from obtaining the configuration files.

There are many methods for securing the TFTP server to try to limit access so that only legitimate cable modems may request files from the TFTP server. These methods typically involve implementing filters on the cable modems or by placing network firewalls in front of the TFTP servers. While these methods are often effective, many times they are not, due to human error and misconfiguration of the filters or firewalls.

Thus what would be useful is a system and method that prevents unauthorized retrieval of cable modem configuration files from an available file server. As is demonstrated below, applicants have developed such a method that is secure yet fully compatible with DOCSIS specifications.

BRIEF SUMMARY OF THE INVENTION

The invention is an application designed to reduce or eliminate unauthorized access to cable modem configuration files. The filename of cable modem configuration files are transmitted from the DHCP server in a disguised or encrypted fashion that rely upon authorization keys unique to a single cable modem and a coordination pass phrase unknown to the cable modem. Cable modem configuration files are stored on a TFTP server and transmitted only upon receipt of a request for a valid disguised name with proper authentication key from a cable modem.

Various embodiments of the invention incorporate differing methods to generate and respond to the modified cable modem configuration filenames.

Preferred methods and embodiments are compatible with DOCSIS specifications versions 1.0, 1.1 and 2.0.

DETAILED DESCRIPTION OF THE INVENTION

The invention is an application designed to reduce or eliminate unauthorized access to cable modem (CM) configuration files. The CM configuration file is retrieved by an authorized user from a trivial file transfer protocol (TFTP) server in response to a user TFTP getfile request.

Figure 1:
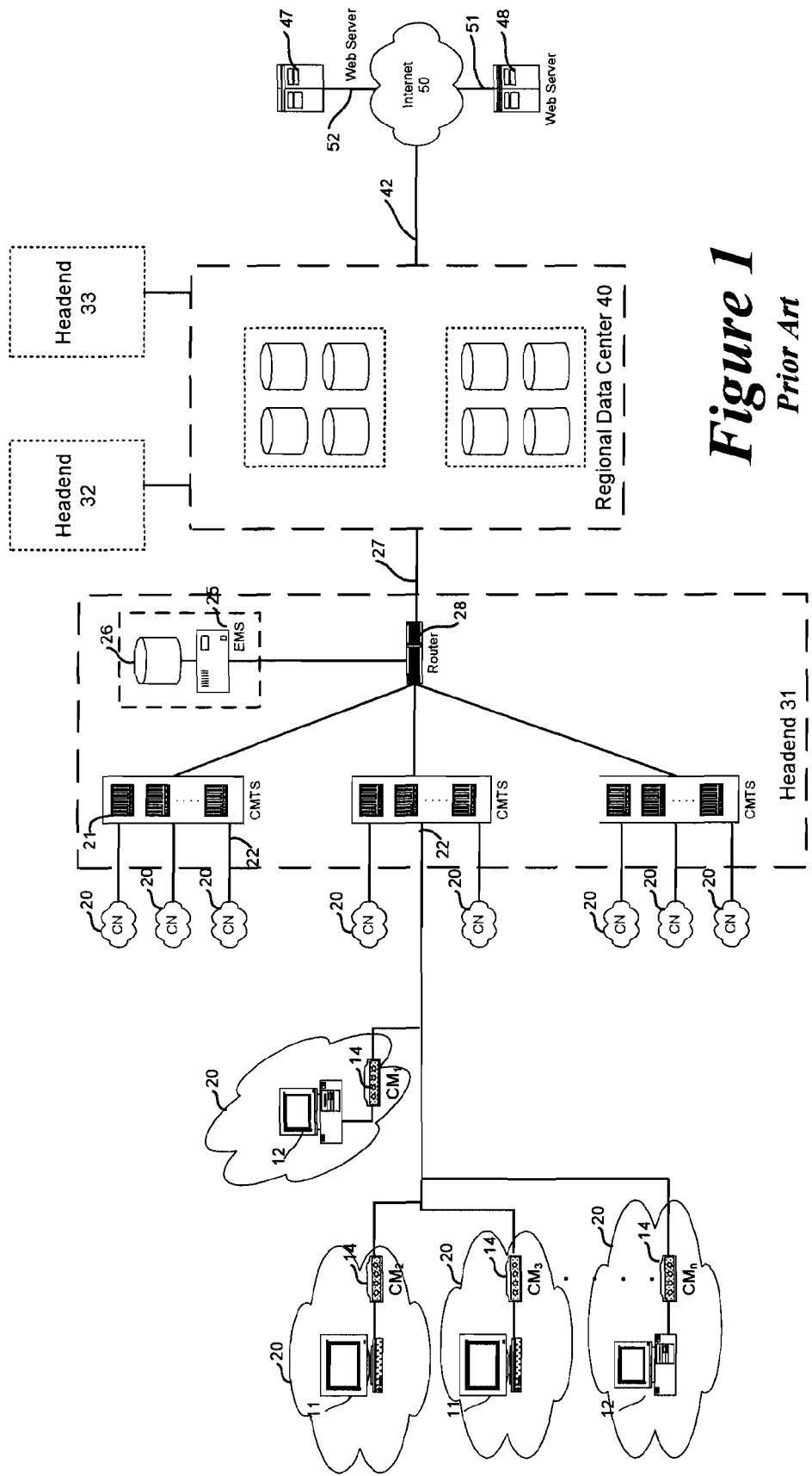
FIG. 1 illustrates a typical network as known in the art and using cable network connectivity.
Figure 2:
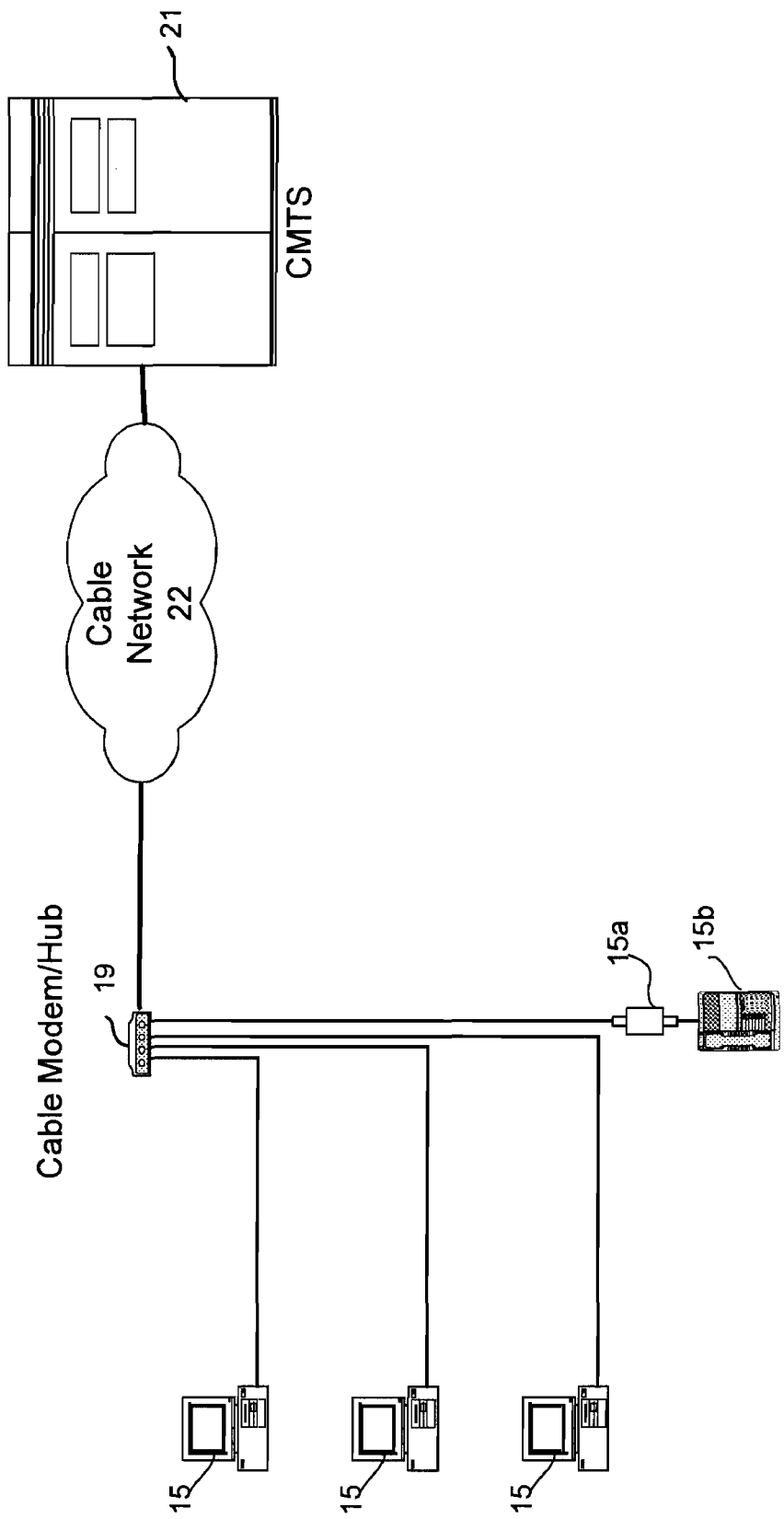
FIG. 2 is a simplified schematic illustrating a combined cable modem/hub.
Figure 3:
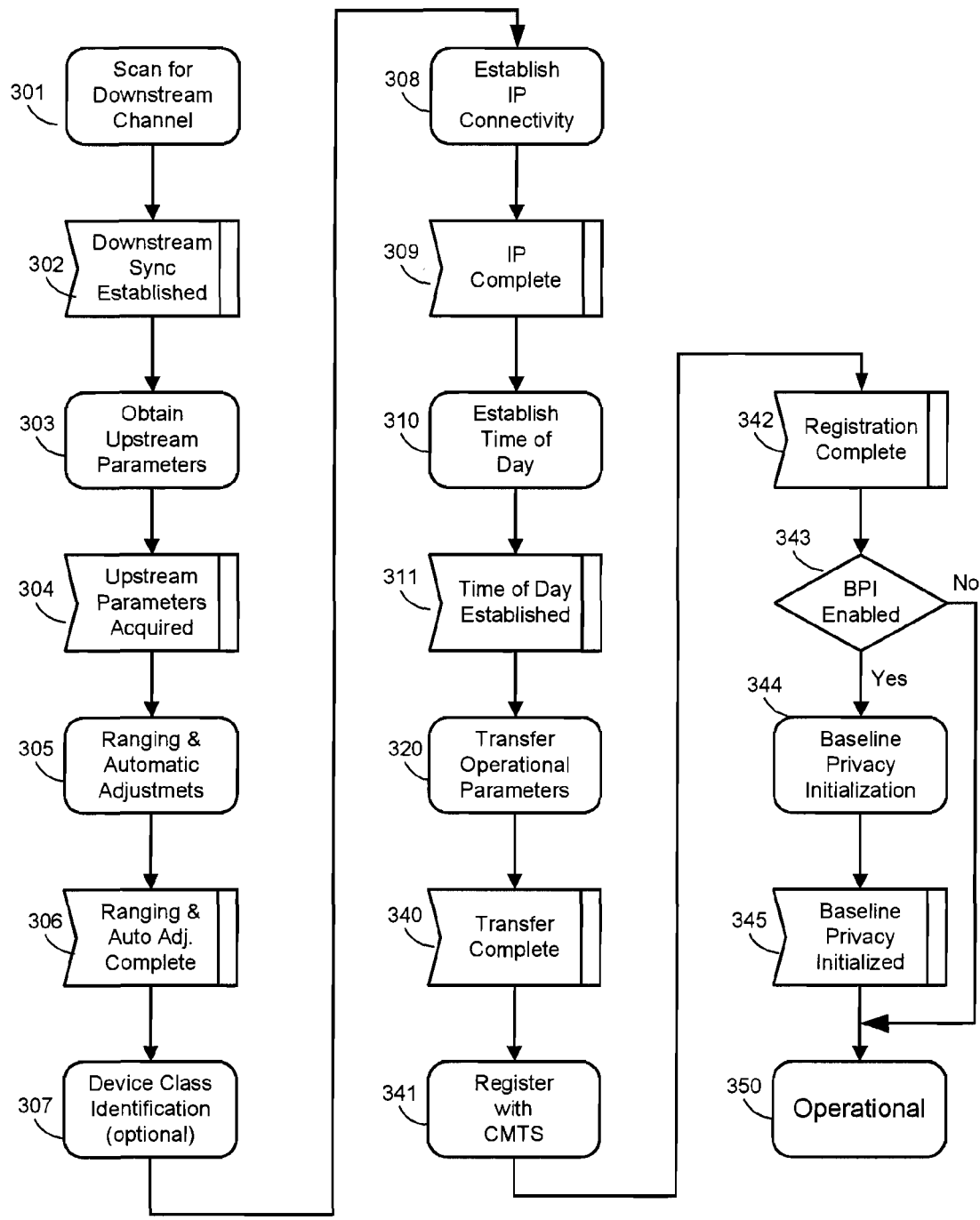
FIG. 3 illustrates the steps for initialization of a cable modem in a DOCSIS compatible network.

When a cable modem boots, it sends a DHCP request to a DHCP server as illustrated as step 308 of FIG. 3. As used herein "cable modem boots" refers to the startup sequence of steps performed by a cable modem during power up or initialization. This may occur upon initial powering of the modem, subsequent to a loss of synchronization signal, or after a forced reset from the DOC network carrier.

Figure 5:
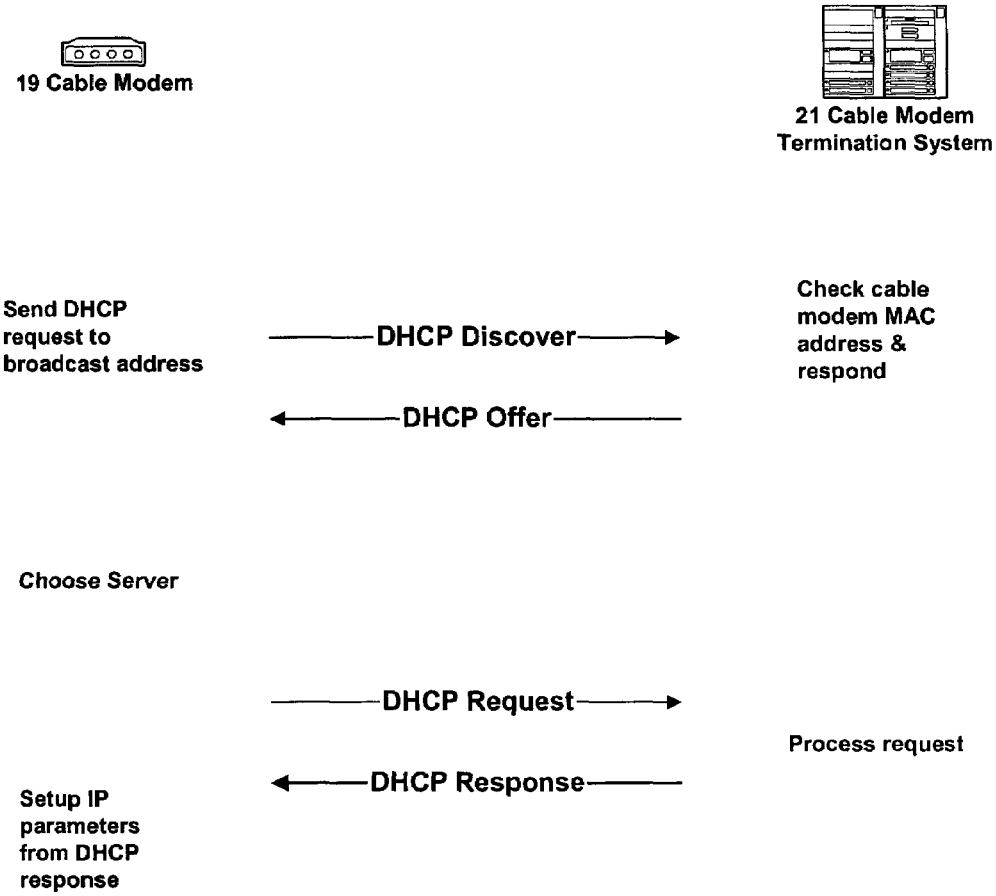
FIG. 5 illustrates a typical cable modem request and response to establish internet protocol connectivity.

FIG. 5 illustrates step 308 in acquiring an Internet protocol address in greater detail. The request for IP address is in the form of a DHCP packet. Table 1 indicates the general form of a DHCP packet (size of data in octets is indicated in parenthesis). Table 1 is organized by bit and octet.

TABLE 1

DHCP Packet

```
                    1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    opcode (1) |    htype (1)  |    hlen (1)   |    hops (1)   |
+---------------+---------------+---------------+---------------+
|                            xid (4)                            |
+-------------------------------+-------------------------------+
|           secs (2)            |           flags (2)           |
+-------------------------------+-------------------------------+
|                           ciaddr (4)                          |
+---------------------------------------------------------------+
|                           yiaddr (4)                          |
+---------------------------------------------------------------+
|                           siaddr (4)                          |
+---------------------------------------------------------------+
|                           giaddr (4)                          |
+---------------------------------------------------------------+
|                                                               |
|                                                               |
|                          chaddr (16)                          |
|                                                               |
|                                                               |
+---------------------------------------------------------------+
|                                                               |
|                           sname (64)                          |
+---------------------------------------------------------------+
|                                                               |
|                           file (128)                          |
+---------------------------------------------------------------+
|                                                               |
|                          option (64)                          |
+---------------------------------------------------------------+
```

For DOCSIS, the field values used in the DHCP Request are indicated in Table 2:

TABLE 2

DHCP Server Parameters Transmitted in DHCP Request from Cable Modem (Step 308)

| Parameters | Value/Use |
|---|---|
| opcode | Operation Code - 1 for DHCP Request, 2 for DHCP Reply |
| htype | Hardware Type - 1 for Ethernet |
| hlen | Hardware Length - 6 for DOCSIS |
| hops | CM sets to 0, optionally used by a relay-agent |
| xid | Transaction ID - random number associated with transaction that is generated by the cable modem |
| secs | Seconds elapsed since cable modem started initialization |
| flags | Flags including a broadcast bit |
| ciaddr | Client Identifier set by cable modem to 48 bit MAC address of modem |
| yiaddr | used for the IP address to be reserved/used by the cable modem |
| siaddr | used for TFTP server IP address |
| giaddr | IP address of relay agent, if any |
| chaddr | Client Hardware address - set to 48 bit MAC address of cable modem |
| sname | optional server address, or TOD server address |
| file | filename or null prior to DHCP Response |
| options | option codes, also identification of cable modem vendor |

The DHCP server responds to the request with, among other things, an IP address to be assigned to the cable modem, a TFTP server IP address, and the name of the DOCSIS configuration file that the modem should request from the TFTP server. These parameters along with other parameters transmitted from the DHCP server to a cable modem are identified in Table 3.

TABLE 3

DHCP Server Parameters Transmitted in DHCP Response to Cable Modem (Step 308)

| DHCP Server Parameters | Description |
|---|---|
| IP address for the cable modem's cable interface | This IP address typically is assigned dynamically but the DOC Carrier can also statically assign IP addresses on the basis of each modem's MAC address. |
| IP subnet mask for the cable modem's cable interface | This subnet mask typically is used for all cable modems using the same downstream, but this depends on the setup of the CMTS network as well as subscribers' needs. |
| IP address for the TFTP server | This TFTP server provides the DOCSIS configuration file to the cable modem and is typically a dedicated server located at the DOC Carriers' headend. |
| IP address for the DHCP relay agent | A DHCP relay agent is required if the DHCP server is located on a different network than the IP address assigned to the cable modem's cable interface. The DHCP relay agent is also used if the DHCP server is providing IP addresses to the CPE devices connected to the cable modem and the CPE devices are on a different subnet than the cable modem. |
| Complete filename for the DOCSIS configuration file | This is the filename for the DOCSIS configuration file that the cable modem should download from the TFTP server. |
| IP address for one or more time of day (ToD) servers | The cable modem uses the ToD server to get the current date and time so that it can accurately timestamp its SNMP messages and error log entries. |
| One or more IP addresses for the routers that will forward IP traffic from the cable modem | Typically, the CMTS acts as the default gateway for the cable modem. |

TABLE 3-continued

DHCP Server Parameters Transmitted in DHCP Response to Cable Modem (Step 308)

| DHCP Server Parameters | Description |
|---|---|
| One or more IP addresses for System Log (SYSLOG) servers | The cable modem can send its error log messages to the SYSLOG servers, which are optional and typically located at the DOC Carriers' headend. |

The DOCSIS configuration filename ("file" of Table 2) is typically limited to 128 octets of data. The naming convention of the file is also required to be compatible with filename conventions for the TFTP server. TFTP normally uses filenames in netascii format. Netascii is an eight-bit ASCII protocol with the first bit always set high, for error checking. In addition to the TFTP requirement, the filename needs to conform to any filename convention required by the TFTP server operating system. This will normally prevent naming the configuration file with non-printing or reserved characters.

As illustrated in FIG. 3, once the cable modem has established Internet protocol 309, it proceeds with establishing time of day 310 and 311 (from ToD server identified in DHCP download). The cable modem then requests a download transfer 320 of a configuration file containing operational parameters.

Figure 6:
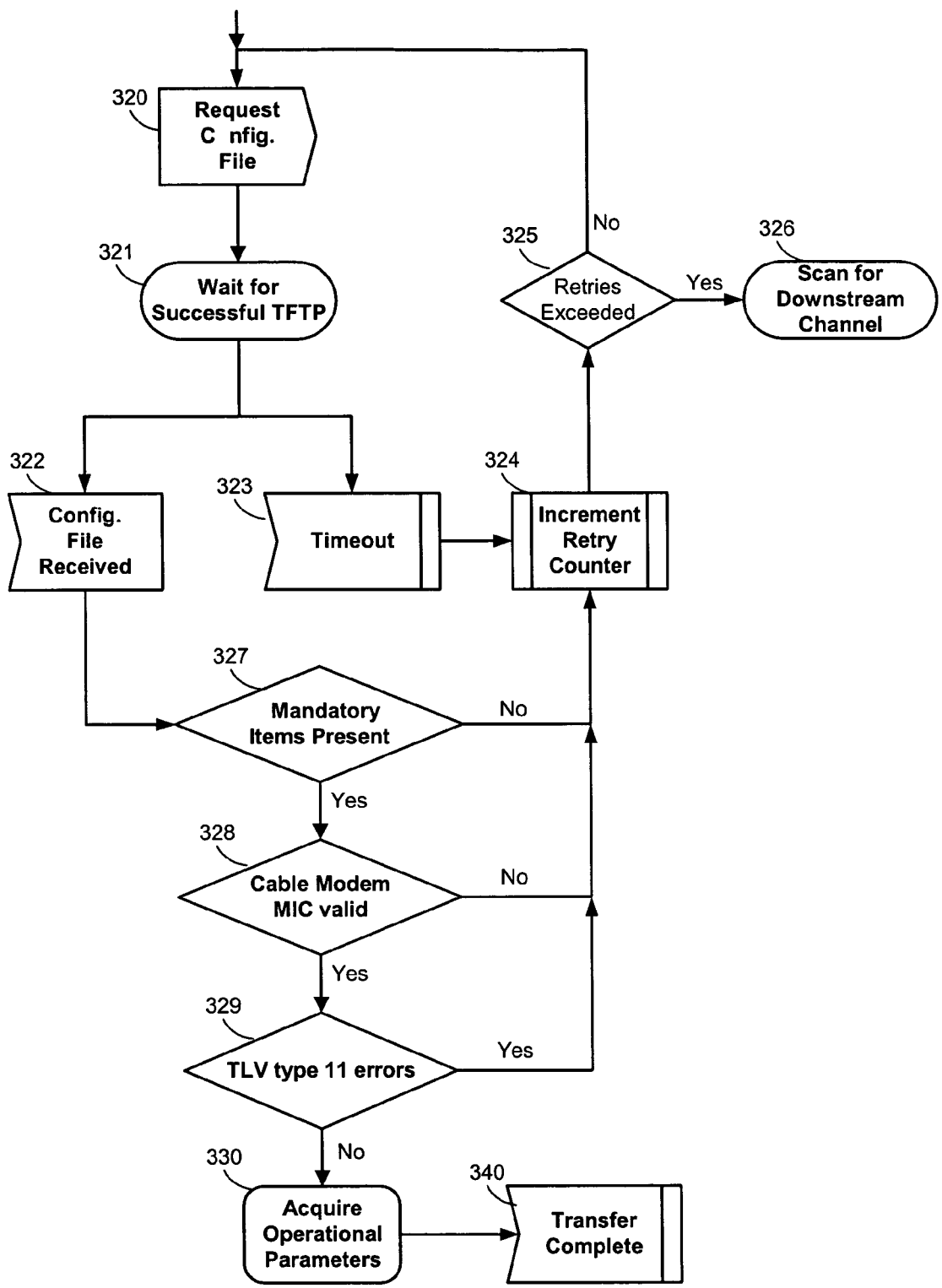
FIG. 6 illustrates a typical cable modem request and response to transfer operational parameters, for example from a trivial file transfer protocol (TFTP) server.

FIG. 6 illustrates step 320, acquiring a configuration file in more detail.

Using user datagram protocol (UDP), a CM requests a configuration file from the TFTP server. The UDP protocol request is limited to the UDP header and the configuration file name. UDP headers consist of 8 bytes of data, 2 each for source port address, destination port address, total message length and checksum. The UDP is transmitted within the data field of an Internet protocol datagram packet. The IP datagram packet includes a header identifying the IP address currently in use by the cable modem.

After the request is made to the TFTP server, the cable modem begins waiting for either a configuration file to arrive and starts a timeout clock 323. Upon the earlier of timeout 323 or receipt of a configuration file 322, this step of the initialization continues. In the case of timeout 323, the retry counter is incremented 324 and if retries are not exceeded 325, the cable modem transmits an additional request for a configuration file 320.

When a configuration file is received 322, the file is verified as having all of the mandatory items 327, the message integrity checks (MIC) are valid 328 and that there are no TLV type 11 errors 329. There are two separate MIC checks, designated for the cable modem and cable modem termination system respectfully.

Use of MIC checks ensures that data in a file has not been altered during transmission and receipt. Performing a "MD5 digest" of the originating data creates them.

TLV type 11 errors 329 occur during the TLV-11 element to PDU translation when a configuration file has a requested option that is unsupported by the cable modem hardware and firmware.

Providing the received configuration file is properly received and no errors are found, the cable modem will then initialize the operational functions and options present in the configuration file 330. At this point, configuration file transfer is complete 340 and the cable modem initialization is ready to perform registration (step 341 of FIG. 3).

As noted above, the cable modem acquires the parameter configuration file from a Trivial File Transfer Protocol (TFTP) server. The contents of a DOCSIS 1.0 compliant configuration file are indicated in Table 3. DOCSIS 1.1 and DOCSIS 2.0 compliant configuration files differ somewhat in their contents, but the exchange of configuration files via TFTP is the same in all cases.

TABLE 3

Cable Modem Configuration File Parameters

| Configuration File Parameters | Description |
|---|---|
| Downstream Frequency | Specifies the center frequency (in multiples of 62500 Hz) for the downstream channel to be used by the router. (This parameter does not need to be specified in the configuration file because the router will scan the downstream for available frequencies, but typically it is specified to ensure that the router conforms to the provider's channel plan.) |
| Upstream Channel ID | Specifies channel ID for the upstream channel to be used by the router. (This parameter does not need to be specified in the configuration file because it can be set dynamically by the CMTS during provisioning.) |
| Network Access Configuration | Determines whether CPE devices attached to the cable modem are allowed access to the cable network. The default is to allow access for CPE devices (which is required for normal operations). |
| Class of Service ID | Specifies the ID for this class of service (1-16). |
| Maximum Downstream Rate | Specifies the maximum downstream data rate (in bits/sec) allowed for traffic associated with this class of service. (This is a limit, not a guarantee of service.) |
| Maximum Upstream Rate | Specifies the maximum upstream data rate (in bits/sec) allowed for traffic associated with this class of service. (This is a limit, not a guarantee of service.) |

TABLE 3-continued

Cable Modem Configuration File Parameters

| Configuration File Parameters | Description |
| --- | --- |
| Upstream Channel Priority | Specifies the priority for upstream traffic (0-7, where 7 is highest priority). |
| Minimum Upstream Rate | Specifies the minimum upstream data rate (in bits/sec) that is guaranteed for traffic associated with this class of service. |
| Maximum Upstream Channel Burst | Specifies the maximum size of burst traffic to be allowed on this upstream channel. The size is specified in bytes, 0-65535, where 0 is no limit. If this field is set to a non-zero value, it should be set to at least 1800 so that it is greater than the maximum Ethernet frame size of 1518 plus the associated packet overhead). |
| Class of Service Privacy Enable | Specifies whether BPI encryption should be enabled on traffic associated with this class of service (1 enables BPI encryption, 0 disables BPI encryption). |
| Vendor ID | The three-byte Organization Unique Identifier for the vendor, which is also usually the first three bytes of the cable modem's MAC address. This value is usually expressed as a hexadecimal number (e.g. 00000C) |
| Vendor-Specific Options | Contains any arbitrary values that are defined by the manufacturer of the cable modem. |
| SNMP Write-Access Control and SNMP MIB Objects | Allows the service provider to set arbitrary SNMP attributes on the cable modem. |
| Authorize Wait Timeout | Specifies the retransmission interval, in seconds, of Authorization Request messages from the Authorize Wait state. Valid values are 2-30 seconds. |
| Reauthorize Wait Timeout | Specifies the retransmission interval, in seconds, of Reauthorization Request messages from the Authorize Wait state. Valid values are 2-30 seconds. |
| Authorization Grace Timeout | Specifies the grace period for re-authorization, in seconds. Valid values are 1-1800 seconds. |
| Operational Wait Timeout | Specifies the retransmission interval, in seconds, of Key Requests from the Operational Wait state. Valid values are 1-10 seconds. |
| Rekey Wait Timeout | Specifies the retransmission interval, in seconds, of Key Requests from the Rekey Wait state. Valid values are 1-10 seconds. |
| TEK Grace Time | Specifies the grace period for re-keying, in seconds. Valid values are 1-1800 seconds. |
| Authorize Reject Wait Timeout | Specifies how long, in seconds, a cable modem waits in the Authorize Reject Wait state after receiving an Authorization Reject. Valid values are 60-1800 seconds. |
| Maximum Number of CPEs | Determines the maximum number of CPE devices that can use the cable modem to connect to the cable network. |
| CPE Ethernet MAC Address | Configures the cable modem with the MAC addresses for one or more CPE devices that are allowed to connect to the cable network. Cable modems give priority to the CPE devices whose MAC addresses are in the configuration file. |
| TFTP Software Server IP Address | Specifies the IP address for the TFTP server that will provide software images. This server does not necessarily have to be the same TFTP server that provided the DOCSIS configuration file. |
| Software Image Filename | Specifies the fully qualified path name for the software image that the cable modem should be running. If necessary, the cable modem uses TFTP to download this image from the software server. |
| Concatenation Support | Specifies whether the cable modem supports DOCSIS 1.1 concatenation of upstream packet requests. |
| Use RFC2104 HMAC-MD5 | Specifies the algorithm used to compute the CMTS Message Integrity Check (MIC). If yes, the HMAC-MD5 algorithm specified in RFC 2104 is used; otherwise, the algorithm specified by RFC 1321 is used. (The algorithm used must match the one used on the CMTS.) |
| CMTS Authentication | Specifies an authentication string to be used between the provisioning server and the CMTS. It allows the CMTS to authenticate the CM provisioning with a central authentication service, such as a RADIUS ® server. |

After the TFTP transfer of the CM configuration file is complete (step 340 of FIG. 3), the CM does a registration with the CMTS 342, establishes baseline privacy interface (steps 342-345, if enabled) and then is operational 350. Registration consists of registration request from the CM to the CMTS followed by registration response from the CMTS to the CM.

One feature known in the art, is that TFTP protocol allows file downloads with very little security. Often the only pre-requisite to downloading from a TFTP server is network access, TFTP server address, destination address and filename. One traditional approach to protecting access to CM configuration files is with a firewall that prevents unauthorized users from accessing the server.

Figure 4:
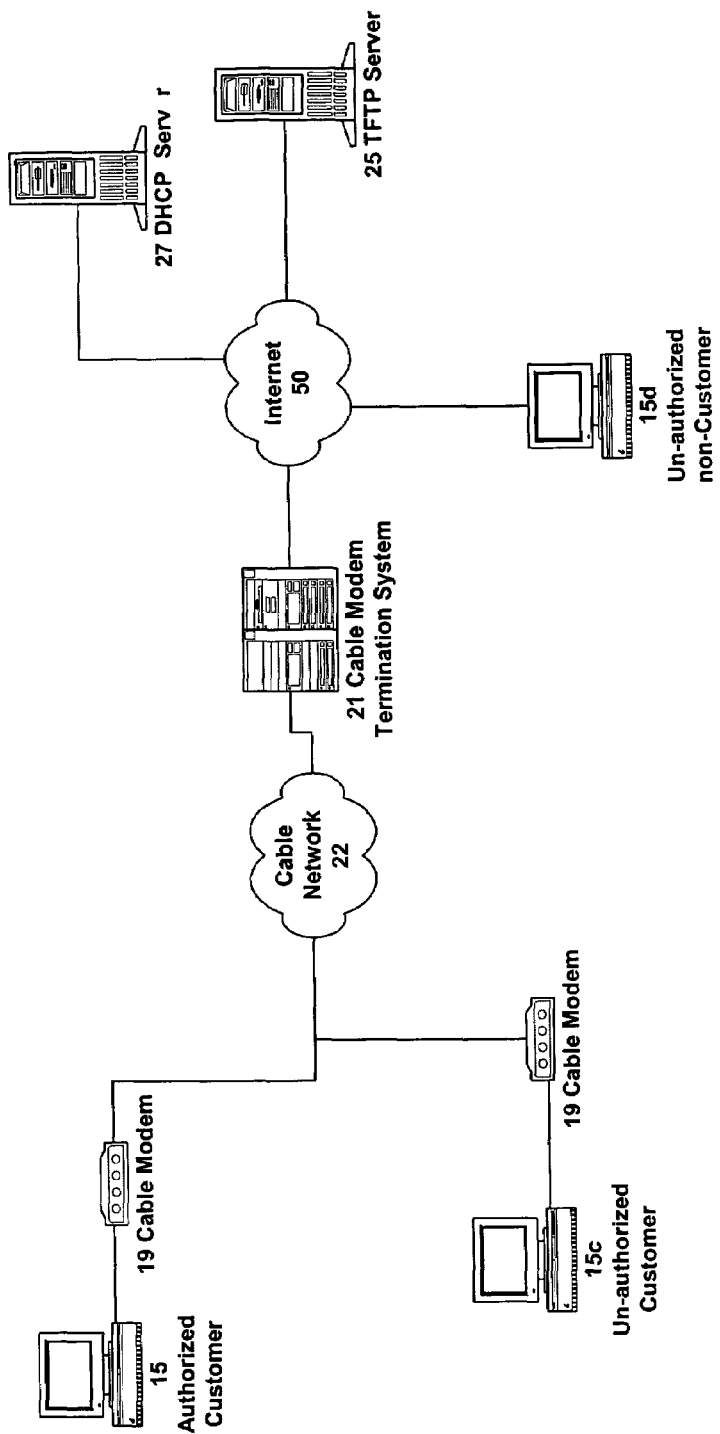
FIG. 4 illustrates a typical network as known in the art identifying potential unauthorized users.

Two different types of unauthorized users attempting to obtain a configuration file are illustrated in FIG. 4. User 15*c* is a valid customer of the DOC network provider but is using services or bandwidth not authorized. User 15*d* is not an unauthorized user who is also not a customer of the DOC network provider. Commonly such users will imitate a valid customer (i.e. spoof the DOC network connections). Users such as user 15*d* may be prevented from acquiring a cable modem configuration file by use of firewalls, as is known in the art. Firewalls are used to prevent unauthorized access to network assets. As user 15*d* is an unauthorized user without any authorization to use the DOC network, a firewall may be used to successfully thwart attempts to acquire a configuration file.

One form of firewall is to have CMTS filter out network messages originating from cable modems that fail DOCSIS message integrity checks (MIC). Similarly, cable modems may be prevented from registering with a CMTS (steps 341, 342 of FIG. 3) unless the cable modem is using a configuration file that has been downloaded from the DOC carriers' TFTP server.

In contrast to user 15*d* of FIG. 4, user 15*c* is a more difficult to protect against. These users are valid customers so they have authorization to connect to the DOC network as well as to have their cable modem 19*c* register with CMTS 21.

These users are invoiced amounts for a particular DOC service level limited as to bandwidth, class of service, quality of services, optional features, etc. but are using DOC network services or bandwidth in excess of their service agreements. One means users 15*c* accomplish this is by capturing a configuration file for a valid authorized customer having higher service rates and then downloading this captured configuration file into their cable modem 19*c*.

An alternate method users 15*c* employ involves retrieving the configuration file of their cable modem, editing the file, then re-inserting the edited file into the cable modem. When the editing removes bandwidth limits the result may be that users 15*c* enjoy the maximum bandwidth available on the network segment attached to their cable modem 19*c*. Using unlimited bandwidth is termed called "uncapping" bandwidth.

As users 15*c* are also customers, any scheme that prevents 15*c* from using unauthorized (and in most cases, unpaid for) network services must not interrupt the service such users are authorized to enjoy. Unfortunately, most techniques that add methods to restrict 15*c* unauthorized network usage also make the DOC network less robust by being more sensitive to outside events. For example, outside events include power failures, loss of signal, as well as lowered signal to noise ratios, electrostatic interference, an the like.

One approach to 15*c* users is the strict enforcement of the MIC checking. The MIC is often based on a Message Digest 5 (MD5) hash of the contents of the cable modem configuration file. MD5 is a one-way (non-invertible) hash—meaning that the input cannot be recovered from the output—and the output is considered unique for a specific input. If the MIC is not correct, the cable modem registration process fails and the cable modem is not allowed to become operational.

Publicly available tools exist to create a DOCSIS-compliant configuration file, including a valid MIC. However, a "shared-secret" can be included in the MD5 hash value. Without the shared secret, it is extremely difficult to produce the correct matching MIC, and the cable modem is prevented from registering with the DOC provider's network. This approach dramatically reduces the ease by which user 15*c* can modify the user's configuration file by using simple editing tools.

However, if the shared secret is configured identically on all of the systems within a service provider's network and TFTP spoofing is possible, then other valid configurations containing different parameters for the same service provider network can be interchanged and downloaded to a cable modem. The modem will be allowed to come on line because the shared secret is the same. In addition, while the MD5 hash is non-invertible, the shared secret to compute it can be recovered from the CMTS router configuration. Presently a cable modem shared secret may be encrypted, but normally such encryption is not cryptographically secure (For example, Cisco provides the command "service password-encryption" which invokes "mode 7" encryption.)

Figure 7:
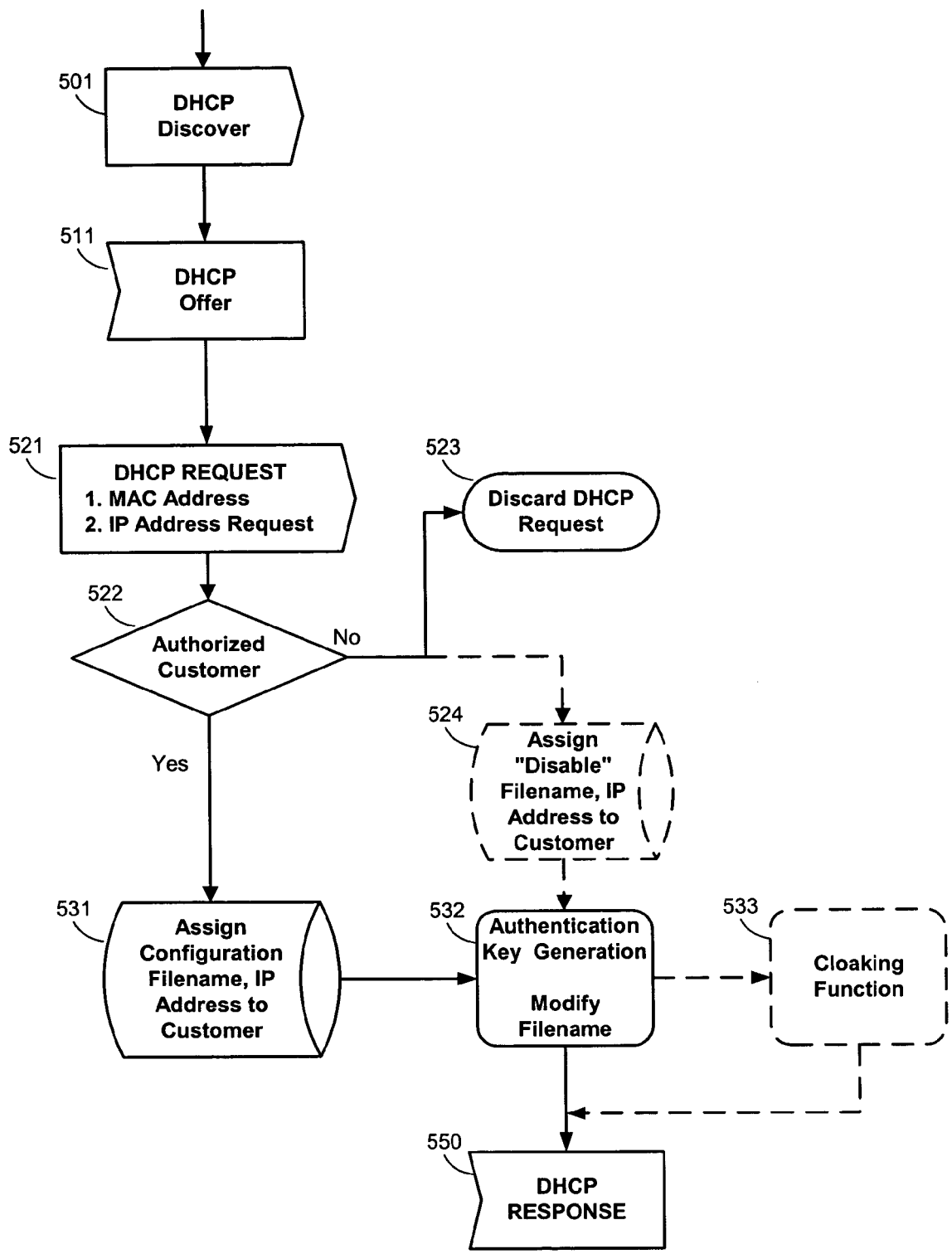
FIG. 7 illustrates a flowchart of steps during a typical cable modem request and response to establish internet protocol connectivity in accordance with some embodiments of the present invention.
Figure 8:
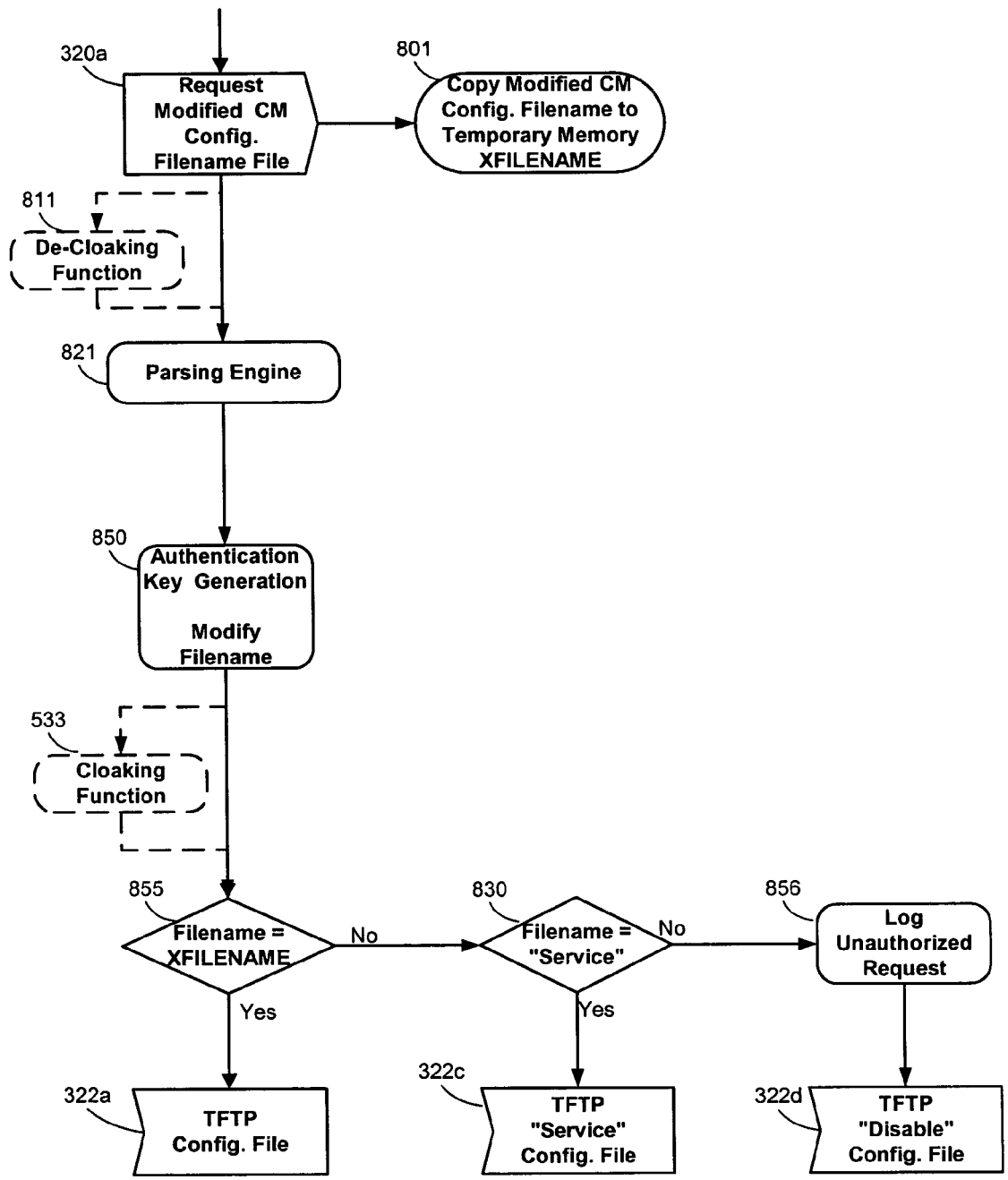
FIG. 8 illustrates a flowchart of steps during a TFTP server response to a typical cable modem request for operational parameters for some embodiments of the present invention.

The present invention avoids many of the pitfalls of these approaches by reducing or eliminating unauthorized downloads of configuration files from the TFTP server. FIG. 7 and FIG. 8 illustrate how the present invention differs from the traditional DHCP and TFTP server functions. As illustrated in FIG. 7, the present invention modifies the configuration filename supplied by the DHCP server during establishing of IP connectivity (steps 308, 309 of FIG. 3). A modified filename is downloaded from the DHCP to the cable modem. The modified filename comprises the actual filename combined with an authentication key that is generated by the DHCP server from the filename, assigned IP address and coordinated pass phrase. The authentication key may further incorporate additional data or parameters. Optionally, the modified filename can be further disguised through the use of a cloaking function, as described below.

Typical names of cable modem configuration files include a TFTP server pathname, filename, and filename extension such as "bin", "cm" or "md5". As noted earlier, the filename field used by DHCP servers and cable modems may contain up to 128 octets, grouped into netascii characters.

The present invention uses the DHCP server to create the modified configuration filename and pass it along with the assigned IP address to the cable modem. The cable modem, in turn, transmits a request for a file with a name matching the modified filename to the TFTP server.

In preferred embodiments of the invention, the cable modem uses the modified filename "as is". In this fashion, existing installed cable modems (e.g. DOCSIS 1.0, DOCSIS 1.1 and DOCSIS 2.0 compliant) may be utilized without modification. As the number of installed cable modems in a typical DOC network carrier may exceed 3 million modems, the advantages of not requiring the change or modification of the cable modems are very significant.

Some of the other embodiments of the invention require that the cable modem create the modified configuration filename by incorporating data not transmitted in the DHCP-DISCOVERY or DHCPREQUEST commands. Although this approach is useful where very high security DOC networks are needed, in most instances the cost of special cable modem hardware and interfaces will be unjustified.

As used herein "modified CM configuration filename" refers to filenames modified in accordance with the present invention, for example as illustrated by FIG. 7. Similarly, "modified CM configuration filename file" refers to a cable modem configuration file associated or otherwise identified by the modified CM configuration filename.

In FIG. 7, the DHCP server receives the IP address request from the cable modem 521. As earlier described, prior to DHCP REQUEST 521, the cable modem transmits one or more DHCP DISCOVER 501 packets and has received one or more DHCP OFFER 511 packets from DHCP servers. The IP address request 521 contains information about the cable modem including the cable modem MAC address, and requested IP address (i.e. same IP address as in DHCP OFFER 511 packet).

The DHCP server compares the received cable modem MAC address to those associated with authorized customers and the service plan authorized for those customers 522. Requests using MAC addresses not associated with authorized customers are discarded and ignored 523. MAC addresses of authorized customers are assigned the requested IP address along with a configuration filename corresponding to the authorized or agreed to service plan 531. Instead of ignoring requests from unauthorized customers, the DHCP server may optionally respond with the name of a "disable" configuration file 524 containing instructions to deny data services to the cable modem.

The DHCP server next creates an authentication key and combines the customer authorized configuration filename with the authentication key to form a modified configuration filename 532. Optionally, the DHCP server applies a cloaking function to further secure the modified filename 533. This modified filename is the modified CM configuration filename and is inserted into the "file" parameter field of the DHCP Response packet and the DHCP server forwards the packet to the cable modem 550.

Various ways of combining the authentication key with a configuration filename are known. For example, the authentication key may be appended to the original filename using traditional text concatenation. In order to facilitate recognition by the TFTP server, it may be desirable to separate the original filename from the authentication key with one or more delimiter characters.

Taking the example of an original configuration filename platinum.cm, an authentication key of 1234567890abcdef and a delimiter @ could result in a modified CM configuration file name of platinum.cm@1234567890abcdef.

Needed by the present invention is an authentication key that depends upon various parameters and concurrently protects from discovery the values of those parameters. Preferably the authentication key depends upon the assigned cable modem IP address and the original configuration filename. More preferably the authentication key will also depend upon a "coordinated pass phrase", known only by the DHCP server and the TFTP server. Other parameter values may also be included, provided they are available to both the TFTP server as well as the DHCP server.

Creation of the authentication key may use such methods as block cipher, iterated block cipher, stream cipher, hash function, message authentication codes, factoring, discrete logarithms, elliptic curves, lattice cryptosystems, or other one-way encryption functions. Some of the common functions include, but are not limited to, Data Encryption Standard (DES), Data Encryption Algorithm (DEA), extended Data Encryption Standard (DESX), Advanced Encryption Standard (AES, including MARS, RC6), Digital Signature Algorithm (DSA), Rivest's Cipher (RC2), RC4, RC5, Secure Hash Algorithm (SHA), Message Digest Algorithms (MD2, MD4, MD5), International Data Encryption Algorithm (IDEA), Secure And Fast Encryption Routine (SAFER), Fast Data Encipherment Algorithm (FEAL), Skipjack, Blowfish, Carlisle Adams and Stafford Tavares (CAST) and ElGamal.

Although all of the named cryptography methods are suitable, particularly preferred are those that are fast and yet form authentication keys that do not reveal the "seed" parameter values. One of the advantages of some preferred embodiments of the invention is that secure one-way hash totals can be used and decryption of the authentication key is unnecessary. Examples of particularly preferred encryption functions are message digest 5 (MD5), and Rivest's Cipher RC4, RC5 and RC6.

MD5 creates a 128 bit hash total of the fields it digests. The hash total is often represented by a printable 32-character string of hexadecimal digits (base 16) and is easily transmitted between a cable modem, CMTS, DHCP server and TFTP server. As an example, applying MD5 to This is a message yields the hash total 0BD0E17C22869EBD31906E27648E77D4. The hash total may also be represented by a base 64 22-character string (e.g. L0OF8loaevTGQbidkjnfU).

Most of the more secure authentication keys are affected by not only the seed values but also by the order in which they are presented to the encryption subroutine. As the result, the order in which parameters are digested by MD5 must be consistent between the DHCP server and later the TFTP server.

The optional cloaking function 533 may be used to present another layer of security to the modified filename. Various methods of cloaking are known and used in the cryptography arts. One example, is to add random characters into a text string. Another cloaking method is to delete characters from a text string. Further, another method is to intersperse two character strings. Other cloaking methods include increasing the size of an encrypted block by padding with random characters. Preferable cloaking for the instant invention is substituting three or more of the authentication key characters with random characters.

Regardless of whether a cloaking function has been used, the resultant modified CM configuration filename has embedded within the filename the original configuration filename as well as the resultant authentication key.

Figure 9:
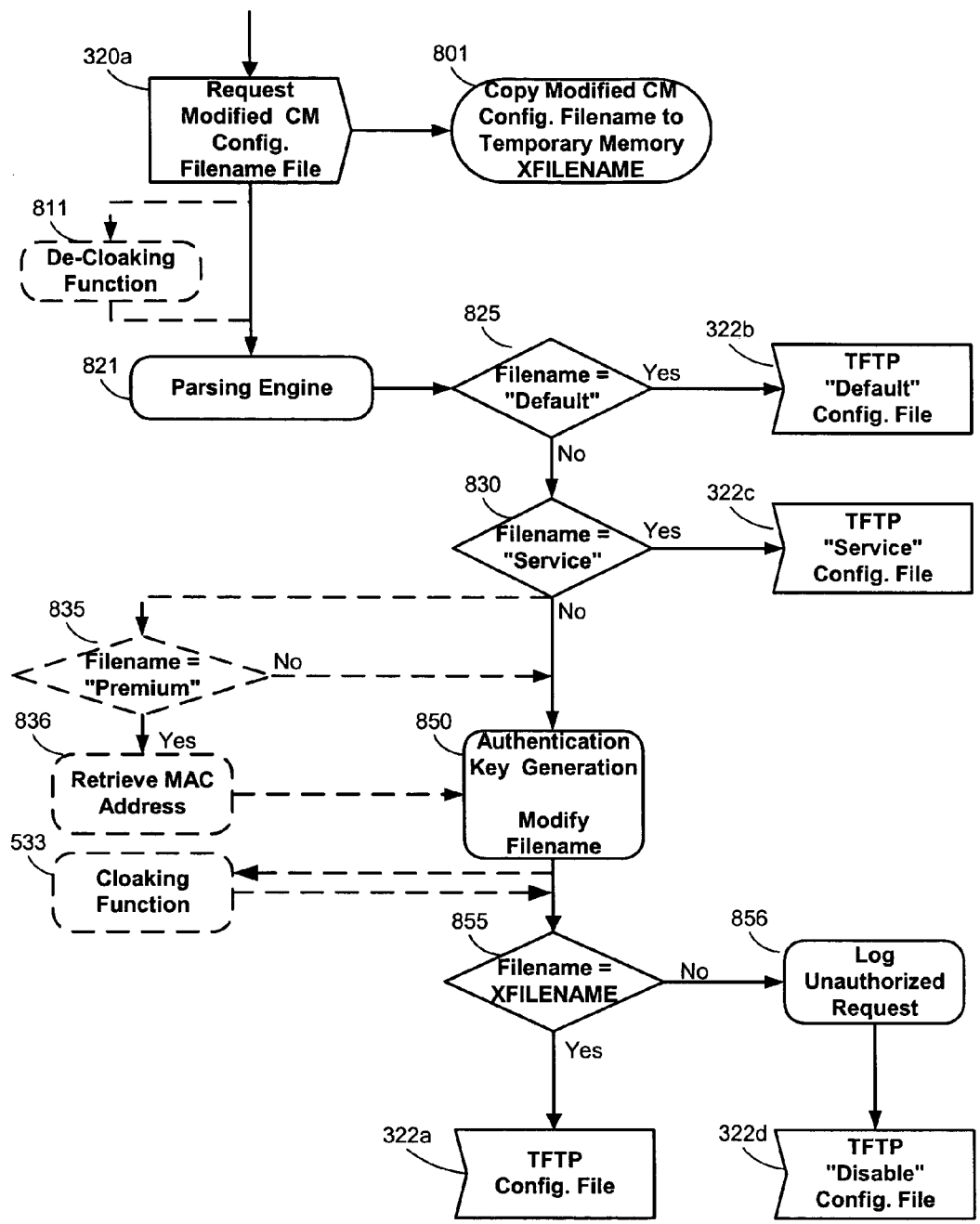
FIG. 9 illustrates a flowchart of steps during a TFTP server response to a typical cable modem request for operational parameters for some embodiments of the present invention incorporating additional steps.

FIG. 8 and FIG. 9 illustrate examples of how a TFTP server in accordance with the present invention may validate and respond to a TFTP request for a modified CM configuration filename. These examples shall not be considered limiting, as the various steps may be combined or performed in an alternate order. Dashed lines indicate optional steps that may be added to incorporate additional desired functions or match DHCP server functions (e.g. as illustrated in FIG. 7).

The compare function 855 of FIG. 8 compares the modified CM configuration filename against a filename generated by the TFTP server. An alternate approach is to compare the original filename to available filenames and also compare the DHCP server authentication key against the TFTP generated authentication key. In either alternative, the TFTP server generates an authentication key 850 using the same method DHCP server utilizes. This is advantageous for software maintenance.

The TFTP server receives a request for a modified CM configuration filename 320a and saves the filename in a temporary memory location XFILENAME 801. Also kept available is the IP address of the requesting cable modem (retrieved from the datagram packet header). In the case the modified CM configuration filename had been cloaked, a de-cloaking function is performed 811. The modified CM configuration filename is then parsed to discover the original unmodified filename 850.

The TFTP server next creates an authentication key using the same method and parameters the DHCP server used 850. Once the authentication key is generated, it is combined with the original un-modified filename discovered by parsing engine 821. Combination of the un-modified filename and authentication key is performed as done by DHCP server. If the DHCP server had used an optional cloaking function, the TFTP server 533 repeats its use. The key generation function at a minimum uses parameters: cable modem IP address, original un-modified filename and coordination pass phrase.

The resulting modified filename will match the received modified CM configuration filename XFILENAME from authorized customers. In this case the TFTP server will transmit the desired cable modem configuration file 322a. When the two filenames do not match, it may be due to unauthorized customer request or cable modem malfunction, or other data transmission problems. When the two filenames do not match, various responses are possible. For example, an error message can be logged 856 and/or the TFTP server can transmit a special cable modem configuration file that disables the unauthorized customer's cable modem 322d. Alternately, a special "service" configuration file can be transmitted to the cable modem 322c. The service configuration file is used by the DOC network carrier service personnel to aid in diagnosing hardware and network problems. Of course, another provision of the TFTP server may be to allow customers to request the service configuration file directly 830.

Comparing the steps performed in FIG. 7 by the DHCP server and those performed in FIG. 8 by the TFTP server highlight the elegance of the present invention. All that must be maintained for the invention to properly perform is to keep the coordination pass phrase and authentication key generation methods consistent.

Preferably the coordination pass phrase is a random phrase that is frequently updated. For highest levels of security, the coordination pass phrase is updated (e.g. changed or rotated) at a frequency to preclude use of common network intrusion software. For example, customer networks comprising cable modems incorporating wireless networks are susceptible to intrusion attacks by the Airsnort program. Using Airsnort, a wireless network encryption is quickly broken once 5 to 10 million encrypted packets are collected (encrypted per IEEE 802.11). With a connection speed of 3.5 megabits per second, it is estimated the Airsnort program can be decrypting messages in approximately 16 minutes. As a result, it is desirable to update the coordination pass phrase at intervals less than the intrusion interval.

As used herein "intrusion interval" refers to the time duration a commonly available software program can solve encryption security of a network attached to the cable modem. For example, when IEEE 802.11 encrypted wireless networks are attached, the intrusion interval is currently 16 minutes.

FIG. 9 illustrates some of the other optional steps that may be present in other embodiments of the invention. Steps 320a, 801, 811 and 821 are the same in both FIG. 8 and FIG. 9. After the modified CM configuration filename is parsed 821, FIG. 9 illustrates examples of how the TFTP server could respond. As noted, parsing engine 821 isolates the original un-modified filename, for example "platinum.cm". TFTP server compares the un-modified filename against filenames for particular DOC network service agreements.

When a low service agreement file is requested it may be desirable to not require additional authorization key checks. By skipping the authorization step, the TFTP server will be able to perform a greater number of transactions in a given time, thereby supporting larger numbers of customers. This will also provide a back-up means in the event the authentication key process is corrupted or the coordination pass phrase is changed or erased in the DHCP server but not in the TFTP server.

In FIG. 9, if the original un-modified filename is "default" 825 then no authentication is performed and the TFTP server transmits the proper default configuration file 322b. The default configuration file would typically be associated with a base or minimum network service agreement to which all customers are authorized.

If the original un-modified filename is "service" 830 then no authentication is performed and the TFTP server transmits the proper service configuration file 322c. As described earlier, a service configuration file could be used during troubleshooting new customers or responding to and diagnosing hardware and network transmission problems.

When the original un-modified filename is associated with a high bandwidth or premium service, authentication keys optionally include additional parameter values. For example, for a "premium" service 835, the cable MAC address can be retrieved from the TFTP server or other database 836 and included in the authentication key generation 850. In contrast to IP address, the MAC address is not available in the datagram header of the configuration file request 320a.

The disadvantage of including the MAC address is reducing the transaction speed of the TFTP server with additional database look-ups. With thousands of customers serviced by each TFTP server, this may result in significant initialization delays. However, by using the method of FIG. 9, only a small delay in TFTP processing occurs as the additional MAC address steps are performed only for premium service customers.

The use of this invention will be limited by the hardware and firmware incorporate into cable modems and cable modem termination systems. Each manufacturer of these devices may have differing means of implementing the DOCSIS standards. As the devices are changed, the invention is easily varied to accommodate the new hardware and firmware.

The coordination pass phrase must be equal in both the DHCP server and the TFTP server in order for the authentication key generation steps to result in matching modified filenames. Preferably the pass phrase is changed frequently in order to promote security and stifle unauthorized user attempts to siphon services.

Although the present invention has been illustrated in terms of specific embodiments, various ways of accomplishing the enumerated steps are possible in accordance with the teachings described herein. For example, the present invention may use DHCP servers and TFTP servers on separately networked computers or integrated into a single provisioning host (as for example a single provisioning host located at a headend). Additionally, the claims should not be read as limited to the described order of steps unless stated to that effect. All embodiments that come within the scope and spirit of the following claims and equivalents thereto are claimed as the invention. The scope of the invention is only to be limited by the following claims:

What is claimed is:

1. A method for providing restricted transmissions of cable modem (CM) configuration files maintained on a trivial file transfer protocol server (TFTP), the method comprising:
   using a dynamic host configuration protocol (DHCP) server to associate an un-modified CM configuration filename to a cable modem Internet protocol (IP) address upon receipt of a DHCP REQUEST;
   storing a coordination pass phrase on a DHCP server and a TFTP server;
   generating a first authentication key;
   creating a modified CM configuration filename by combining a CM configuration filename with the authentication key;
   transmitting the modified CM configuration filename to the cable modem in a DHCP RESPONSE;
   transmitting the modified CM configuration filename from the cable modem to the TFTP server;
   parsing the modified CM configuration filename into the un-modified CM configuration filename;
   generating a second authentication key;
   transmitting the CM configuration file to the cable modem only if the first authentication key matches the second authentication key;
   wherein the first authentication key and the second authentication key depend upon the un-modified CM configuration filename, the cable modem IP address and the coordination pass phrase; and wherein the coordination pass phrase is not known to the cable modem.

2. The method of claim 1 wherein the first authentication key and the second authentication key are generated using an encryption method selected from the group of methods consisting of block cipher, iterated block cipher, stream cipher, hash function, message authentication codes, factoring, discrete logarithms, elliptic curves, lattice cryptosystems, Data Encryption Standard (DES), Data Encryption Algorithm (DEA), extended Data Encryption Standard (DESX), Advanced Encryption Standard (AES, including MARS, RC6), Digital Signature Algorithm (DSA), Rivest's Cipher (RC2), RC4, RC5, Secure Hash Algorithm (SHA), Message Digest Algorithms (MD2, MD4, MD5), International Data Encryption Algorithm (IDEA), Secure And Fast Encryption Routine (SAFER), Fast Data Encipherment Algorithm (FEAL), Skipjack, Blowfish, Carlisle Adams and Stafford Tavares (CAST) and ElGamal.

3. The method of claim 2 wherein the encryption method is a message digest algorithm.

4. The method of claim 2 wherein the encryption method is the message digest MD5 algorithm.

5. The method of claim 1 wherein the first authentication key further depends upon the cable modem media access control address and wherein the second authentication key further depends upon the cable modem media access control address.

6. The method of claim 1 wherein the coordination pass phrase is generated at random intervals by the DHCP server and transmitted to the TFTP server.

7. The method of claim 1 wherein the coordination pass phrase is generated at random intervals by the TFTP server and transmitted to the DHCP server.

8. The method of claim 6 or claim 7 wherein the random intervals do not exceed an intrusion interval of a wireless network.

9. The method of claim 1 wherein an error message is logged if the first authentication key does not match the second authentication key.

10. The method of claim 1 wherein an error message is generated if the first authentication key does not match the second authentication key and wherein the error message is further transmitted to TFTP server support personnel.

11. The method of claim 1 wherein an alternate cable modem configuration file is transmitted to the cable modem if the first authentication key does not match the second authentication key.

12. The method of claim 11 wherein the alternate cable modem configuration file comprises instructions to disable the cable modem.

13. The method of claim 11 wherein the alternate cable modem configuration file comprises instructions to allow for diagnosing cable modem errors.

14. A method for providing restricted transmissions of cable modem (CM) configuration files maintained on a trivial file transfer protocol server (TFTP), the method comprising:
   using a dynamic host configuration protocol (DHCP) server to associate an un-modified CM configuration filename to a cable modem Internet protocol (IP) address upon receipt of a DHCP REQUEST;
   storing a coordination pass phrase on a DHCP server and a TFTP server;
   generating a first authentication key;
   creating a modified CM configuration filename by combining a CM configuration filename with the authentication key;
   creating a cloaked modified CM configuration filename by cloaking the modified CM configuration filename;
   transmitting the cloaked modified CM configuration filename to the cable modem in a DHCP RESPONSE;
   transmitting the cloaked modified CM configuration filename from the cable modem to the TFTP server;
   de-cloaking the cloaked modified CM configuration filename to obtain the modified CM configuration filename;
   parsing the modified CM configuration filename into the un-modified CM configuration filename;
   generating a second authentication key;
   transmitting the CM configuration file to the cable modem only if the first authentication key matches the second authentication key;
   wherein the first authentication key and the second authentication key depend upon the un-modified CM configuration filename, the cable modem IP address and the coordination pass phrase; and wherein the coordination pass phrase is not known to the cable modem.

15. The method of claim 14 wherein the first authentication key and the second authentication key are generated using an encryption method selected from the group of methods consisting of block cipher, iterated block cipher, stream cipher, hash function, message authentication codes, factoring, discrete logarithms, elliptic curves, lattice cryptosystems, Data Encryption Standard (DES), Data Encryption Algorithm (DEA), extended Data Encryption Standard (DESX), Advanced Encryption Standard (AES, including MARS, RC6), Digital Signature Algorithm (DSA), Rivest's Cipher (RC2), RC4, RC5, Secure Hash Algorithm (SHA), Message Digest Algorithms (MD2, MD4, MD5), International Data Encryption Algorithm (IDEA), Secure And Fast Encryption Routine (SAFER), Fast Data Encipherment Algorithm (FEAL), Skipjack, Blowfish, Carlisle Adams and Stafford Tavares (CAST) and ElGamal.

16. The method of claim 15 wherein the encryption method is a message digest algorithm.

17. The method of claim 15 wherein the encryption method is the message digest MD5 algorithm.

18. The method of claim 14 wherein the first authentication key further depends upon the cable modem media access control address and wherein the second authentication key further depends upon the cable modem media access control address.

19. The method of claim 14 wherein the coordination pass phrase is generated at random intervals by the DHCP server and transmitted to the TFTP server.

20. The method of claim 14 wherein the coordination pass phrase is generated at random intervals by the TFTP server and transmitted to the DHCP server.

21. The method of claim 19 or claim 20 wherein the random intervals do not exceed an intrusion interval of a wireless network.

22. The method of claim 14 wherein an error message is logged if the first authentication key does not match the second authentication key.

23. The method of claim 14 wherein an error message is generated if the first authentication key does not match the second authentication key and wherein the error message is further transmitted to TFTP server support personnel.

24. The method of claim 14 wherein an alternate cable modem configuration file is transmitted to the cable modem if the first authentication key does not match the second authentication key.

25. The method of claim 24 wherein the alternate cable modem configuration file comprises instructions to disable the cable modem.

26. The method of claim 24 wherein the alternate cable modem configuration file comprises instructions to allow for diagnosing cable modem errors.

27. A method for providing restricted transmissions of cable modem (CM) configuration files maintained on a trivial file transfer protocol server (TFTP), the method comprising:
   using a dynamic host configuration protocol (DHCP) server to associate an un-modified CM configuration filename to a cable modem Internet protocol (IP) and a cable modem media access control address upon receipt of a DHCP REQUEST;
   storing a coordination pass phrase on a DHCP server and a TFTP server;
   generating a first authentication key;
   creating a modified CM configuration filename by combining a CM configuration filename with the authentication key;
   transmitting the modified CM configuration filename to the cable modem in a DHCP RESPONSE;
   transmitting the modified CM configuration filename from the cable modem to the TFTP server;
   separately obtaining the cable modem media access control address associated with the cable modem IP address;
   parsing the modified CM configuration filename into the un-modified CM configuration filename;
   generating a second authentication key;
   transmitting the CM configuration file to the cable modem only if the first authentication key matches the second authentication key;
   wherein the first authentication key and the second authentication key depend upon the un-modified CM configuration filename, the cable modem IP address, the coordination pass phrase and the cable modem media access control address; and wherein the coordination pass phrase is not known to the cable modem.

28. The method of claim 27 wherein the first authentication key and the second authentication key are generated using an encryption method selected from the group of methods consisting of block cipher, iterated block cipher, stream cipher, hash function, message authentication codes, factoring, discrete logarithms, elliptic curves, lattice cryptosystems, Data Encryption Standard (DES), Data Encryption Algorithm (DEA), extended Data Encryption Standard (DESX), Advanced Encryption Standard (AES, including MARS, RC6), Digital Signature Algorithm (DSA), Rivest's Cipher (RC2), RC4, RC5, Secure Hash Algorithm (SHA), Message Digest Algorithms (MD2, MD4, MD5), International Data Encryption Algorithm (IDEA), Secure And Fast Encryption Routine (SAFER), Fast Data Encipherment Algorithm (FEAL), Skipjack, Blowfish, Carlisle Adams and Stafford Tavares (CAST) and ElGamal.

29. The method of claim 28 wherein the encryption method is a message digest algorithm.

30. The method of claim 28 wherein the encryption method is the message digest MD5 algorithm.

31. The method of claim 27 wherein the coordination pass phrase is generated at random intervals by the DHCP server and transmitted to the TFTP server.

32. The method of claim 27 wherein the coordination pass phrase is generated at random intervals by the TFTP server and transmitted to the DHCP server.

33. The method of claim 31 or claim 32 wherein the random intervals do not exceed an intrusion interval of a wireless network.

34. The method of claim 27 wherein an error message is logged if the first authentication key does not match the second authentication key.

35. The method of claim 27 wherein an error message is generated if the first authentication key does not match the second authentication key and wherein the error message is further transmitted to TFTP server support personnel.

36. The method of claim 27 wherein an alternate cable modem configuration file is transmitted to the cable modem if the first authentication key does not match the second authentication key.

37. The method of claim 36 wherein the alternate cable modem configuration file comprises instructions to disable the cable modem.

38. The method of claim 36 wherein the alternate cable modem configuration file comprises instructions to allow for diagnosing cable modem errors.

39. A method for providing restricted transmissions of cable modem (CM) configuration files maintained on a trivial file transfer protocol server (TFTP), the method comprising:
   using a dynamic host configuration protocol (DHCP) server to associate an un-modified CM configuration filename to a cable modem Internet protocol (IP) and a cable modem media access control address upon receipt of a DHCP REQUEST;
   storing a coordination pass phrase on a DHCP server and a TFTP server;
   generating a first authentication key;
   creating a modified CM configuration filename by combining a CM configuration filename with the authentication key;
   creating a cloaked modified CM configuration filename by cloaking the modified CM configuration filename;

transmitting the cloaked modified CM configuration filename to the cable modem in a DHCP RESPONSE;

transmitting the cloaked modified CM configuration filename from the cable modem to the TFTP server;

separately obtaining the cable modem media access control address associated with the cable modem IP address;

de-cloaking the cloaked modified CM configuration filename to obtain the modified CM configuration filename;

parsing the modified CM configuration filename into the un-modified CM configuration filename;

generating a second authentication key;

transmitting the CM configuration file to the cable modem only if the first authentication key matches the second authentication key;

wherein the first authentication key and the second authentication key depend upon the un-modified CM configuration filename, the cable modem IP address, the coordination pass phrase and the cable modem media access control address; and wherein the coordination pass phrase is not known to the cable modem.

40. The method of claim 39 wherein the first authentication key and the second authentication key are generated using an encryption method selected from the group of methods consisting of block cipher, iterated block cipher, stream cipher, hash function, message authentication codes, factoring, discrete logarithms, elliptic curves, lattice cryptosystems, Data Encryption Standard (DES), Data Encryption Algorithm (DEA), extended Data Encryption Standard (DESX), Advanced Encryption Standard (AES, including MARS, RC6), Digital Signature Algorithm (DSA), Rivest's Cipher (RC2), RC4, RC5, Secure Hash Algorithm (SHA), Message Digest Algorithms (MD2, MD4, MD5), International Data Encryption Algorithm (IDEA), Secure And Fast Encryption Routine (SAFER), Fast Data Encipherment Algorithm (FEAL), Skipjack, Blowfish, Carlisle Adams and Stafford Tavares (CAST) and ElGamal.

41. The method of claim 40 wherein the encryption method is a message digest algorithm.

42. The method of claim 40 wherein the encryption method is the message digest MD5 algorithm.

43. The method of claim 39 wherein the coordination pass phrase is generated at random intervals by the DHCP server and transmitted to the TFTP server.

44. The method of claim 39 wherein the coordination pass phrase is generated at random intervals by the TFTP server and transmitted to the DHCP server.

45. The method of claim 43 or claim 44 wherein the random intervals do not exceed an intrusion interval of a wireless network.

46. The method of claim 39 wherein an error message is logged if the first authentication key does not match the second authentication key.

47. The method of claim 39 wherein an error message is generated if the first authentication key does not match the second authentication key and wherein the error message is further transmitted to TFTP server support personnel.

48. The method of claim 39 wherein an alternate cable modem configuration file is transmitted to the cable modem if the first authentication key does not match the second authentication key.

49. The method of claim 48 wherein the alternate cable modem configuration file comprises instructions to disable the cable modem.

50. The method of claim 48 wherein the alternate cable modem configuration file comprises instructions to allow for diagnosing cable modem errors.

51. The method of claim 48 wherein the alternate cable modem configuration file comprises instructions for default network parameter values.

* * * * *